of
United States Patent
Aufdereggen et al.

[15] 3,683,003
[45] Aug. 8, 1972

[54] PROCESS FOR THE PRODUCTION OF MALONIC ACID DINITRILE

[72] Inventors: Klaus Aufdereggen, Visp; Urs Arni, Brig; Adriano Faucci; August Stocker, both of Visp, all of Switzerland

[73] Assignee: Lonza Ltd., Basle, Switzerland

[22] Filed: March 20, 1970

[21] Appl. No.: 21,485

[30] Foreign Application Priority Data

June 20, 1969 Switzerland..............9422/69

[52] U.S. Cl. ..........................................260/465.8 R
[51] Int. Cl. ....................C07c 121/22, C07c 121/02
[58] Field of Search....................260/465.8, 465.8 R

[56] References Cited

UNITED STATES PATENTS 2,553,406  5/1951  Dixon....................260/465.8
3,417,126  12/1968  Taguchi et al..........260/465.8
3,497,546  2/1970  Levins et al. ...........260/465.8
3,541,133  11/1970  Johnson et al..........260/465.8

Primary Examiner—Joseph P. Brust
Attorney—Christen & Sabol

[57] ABSTRACT

Malonic acid dinitrile is prepared by reacting acetonitrile and cyanogen chloride in the gaseous phase at temperatures between 780° C. and 1,200° C. Yields exceeding 80 percent can be obtained and when the reactants flow through the reactor in a condition exceeding laminar flow and extending into turbulent flow, molar ratios of acetonitrile to cyanogen chloride of 4:1 and over are preferred with residence times at reaction temperatures of less than about 5 seconds.

5 Claims, No Drawings

PROCESS FOR THE PRODUCTION OF MALONIC ACID DINITRILE

This invention relates to a process for the production of malonic acid dinitrile from acetonitrile and cyanogen chloride and is an improvement in and modification of the process described in co-pending application Ser. No. 882,724 filed May 7, 1969.

The co-pending application is directed to a process for the production of pure malonic acid dinitrile by reacting acetonitrile with cyanogen chloride at a temperature of from 740° to 780° C., preferably from 750° to 760° C. to produce malonic acid dinitrile which contains maleic acid dinitrile and fumaric acid dinitrile. The maleic acid dinitrile and fumaric acid dinitrile are removed either by reacting them with a diene to give corresponding Diels-Alder adducts which are then separated, or by selective hydrogenation in the presence of a hydrogenation catalyst to give succinic acid dinitrile which is then separated by fractionation. This process gave malonic acid dinitrile yields of up to 70 percent, at reactor feed rates of 200 g. of the reactants per hour per liter of reactor volume. For example, around 40 g. of malonic acid dinitrile are obtained per hour per liter of reactor volume. In this prior procedure, the molar ratio of cyanogen chloride to acetonitrile was from 1:1 to 1:5, and preferably from 1:3 to 1:4. The residence time of the gaseous reactants in the reactor was from 1 to 15 seconds and preferably from 8 to 11 seconds. In the process, the reactants passed through the reactors in a laminar flow.

Tubular vessels such as quartz tubes, and metal tubes were used as the reactors. It was not considered appropriate to prepare malonic dinitrile by the reaction of acetonitrile and cyanogen chloride at temperatures above 780° C., because higher temperatures were believed to cause decomposition of the product, increase the amount of impurities and reduce the yield.

It has unexpectedly been discovered that high yields, which can exceed 80 percent of the theoretical, are possible in a process for the production of malonic acid dinitrile wherein acetonitrile and cyanogen chloride are reacted in the gas phase at a temperature of from 780° to 1200° C. The reactants are passed through the reactor at a high rate of flow in the range above laminar flow and extending into the range of turbulent flow.

The residence times are decreased as the temperature is increased. At temperatures above 850° C., the residence times are preferably maintained below 5 seconds. At temperatures of from 900° to 1,100° C., residence times of from 4 to 0.01 second are suitable.

The highest yields are obtained with ratios of at least 4 moles of acetonitrile per mole of cyanogen chloride although lower ratios may be used. Molar ratios in the range from 6:1 to 9:1 are particularly suitable and higher molar ratios such as 10:1 do not afford further advantages.

Pipe shaped reactors, such as quartz or metal pipes, are suitable for practicing the present invention. The dimensions are critical only to the extent that the reactants flow in a condition exceeding laminar and extending into turbulent flow. The desired flow condition is easily obtained by adjusting the reactor diameter to the volume of reactants.

The reaction products are immediately cooled to a temperature of from 20° to 50° C. and preferably to a temperature of from 25° to 30° C. Brine is a suitable coolant.

To prevent destruction of the malonic acid dinitrile formed, continuous removal of unreacted acetonitrile and dissolved hydrogen chloride from the liquid reaction mixture, for example by vacuum distillation is advisable.

The following table illustrates the relationship of the yield to the molar ratio, temperature and average residence time. At higher temperatures, shorter residence times have to be used. The molar ratio is also an important factor. The following conditions result in an average yield of around 70 percent.

TABLE I

| Moles acetonitrile per mole of cyanogen chloride | Maximum temp. (°C) | Average residence time (seconds) | g. of malonic acid dinitrile per hour per liter of reactor volume |
|---|---|---|---|
| 4 | 860–890 | 3.5 | 99 |
| 5 | 890–910 | 1.5 | 189 |
| 6 | 890–920 | 1.0 | 242 |
| 7 | 900–930 | 0.8 | 262 |
| 8 | 890–930 | 0.8 | 233 |
| 9 | 860–920 | 1.0 | 770 |

One important advantage of the present invention over the process of the co-pending application is that the manner in which the reactants pass through the reactor produces considerably higher rates of production and makes increased yields possible.

The discovery that it is possible to operate at temperatures in the range from above 780° to 1,200° C. without decomposition was extremely unexpected. Contrary to the expected decomposition, the process of the invention makes possible increased yields.

The products produced according to the present invention may be purified by any conventional method. However, the methods described in co-pending application, Ser. No. 822,724 filed May 7, 1969, are preferred and the disclosure of said application is incorporated herein by reference.

The following examples are presented.

EXAMPLE 1

Cyanogen chloride and acetonitrile, in a molar ratio of 1:4.69, were passed into a quartz tube having an internal diameter of 90 mm. and a temperature of 900° C. The reaction temperature was maintained for a length of 2.03 meters. 7.5 kg. of acetonitrile and 2.4 kg. of cyanogen chloride were reacted over a period of one hour. The rate of flow was 770 g. of starting mixture per hour per liter of reactor volume and the residence time of the reactants was 2.13 seconds. The reaction product was immediately cooled with brine and continuously freed of hydrogen chloride and unreacted acetonitrile by vacuum distillation. The reaction product contained 1.83 kg. of malonic acid dinitrile, which corresponds to a yield of 71.2 percent based on the cyanogen chloride used.

EXAMPLES 2–11

The procedure of Example 1 was followed using various reaction conditions. Tee reaction conditions and yield of malonic acid dinitrile are reported in Table II.

TABLE II

| Ex. No. | Moles of acetonitrile per mole of cyanogen chloride | Maximum temp. in °C | Average residence time in seconds | Yield in % based on cyanogen chloride |
|---|---|---|---|---|
| 2 | 4.24 | 804 | 4.75 | 73.5 |
| 3 | 4.65 | 860 | 4.06 | 75.5 |
| 4 | 4.73 | 945 | 2.32 | 61.9 |
| 5 | 6.55 | 863 | 4.46 | 81.6 |
| 6 | 7 | 990 | 0.80 | 62.0 |
| 7 | 8.76 | 900 | 3.28 | 79.8 |
| 8 | 8.76 | 904 | 3.10 | 79.3 |
| 9 | 9.42 | 879 | 2.74 | 78.6 |
| 10 | 1.43 | 800 | 4.70 | 39.6 |
| 11 | 2.97 | 860 | 3.41 | 67.5 |

What is claimed is:

1. A process for preparing malonic acid dinitrile comprising reacting the components of an admixture consisting of acetonitrile and cyanogen chloride, both in the gaseous phase, at a temperature of from 780° to 1,200° C., said reactants being passed through a tubular reactor at a turbulent flow rate, the residence time being between 0.01 and 5 seconds, and the molar ratio of acetonitrile to cyanogen chloride being in the range of from at least 4:1 to 9.42:1.

2. A process of claim 1 wherein unreacted acetonitrile and dissolved hydrogen chloride are immediately removed from the reaction mixture.

3. A process of claim 1 wherein the temperature is in the range from 850° to 1,100° C.

4. A process of claim 1 wherein the residence time is from 0.1 to 4 seconds.

5. The process of claim 1 wherein the molar ratio of acetonitrile to cyanogen chloride is about 6:1 to 9:1, the temperature is about 860° to about 990° C. and the residence time is about 0.01 to 4 seconds.

* * * * *